(12) United States Patent
Klatt

(10) Patent No.: US 12,127,104 B2
(45) Date of Patent: Oct. 22, 2024

(54) CONTROLLING THE USE AND/OR ACCESS OF USER PLANE RADIO COMMUNICATION RESOURCES OF A TELECOMMUNICATIONS NETWORK

(71) Applicant: Deutsche Telekom AG, Bonn (DE)

(72) Inventor: Axel Klatt, Cologne (DE)

(73) Assignee: Deutsche Telekom AG, Bonn (DE)

( * ) Notice: Subject to any disclaimer, the term of this patent is extended or adjusted under 35 U.S.C. 154(b) by 620 days.

(21) Appl. No.: 17/283,961

(22) PCT Filed: Oct. 9, 2019

(86) PCT No.: PCT/EP2019/077412
§ 371 (c)(1),
(2) Date: Apr. 9, 2021

(87) PCT Pub. No.: WO2020/074610
PCT Pub. Date: Apr. 16, 2020

(65) Prior Publication Data
US 2021/0400573 A1    Dec. 23, 2021

(30) Foreign Application Priority Data
Oct. 10, 2018 (EP) ..................... 18199671

(51) Int. Cl.
*H04W 48/18* (2009.01)
*H04W 48/06* (2009.01)
*H04W 48/16* (2009.01)

(52) U.S. Cl.
CPC ........... *H04W 48/18* (2013.01); *H04W 48/06* (2013.01); *H04W 48/16* (2013.01)

(58) Field of Classification Search
None
See application file for complete search history.

(56) References Cited

U.S. PATENT DOCUMENTS

2013/0035064 A1    2/2013  Balachandran
2018/0376407 A1   12/2018  Myhre et al.
(Continued)

FOREIGN PATENT DOCUMENTS

CN    108282751 A    7/2018
CN    108476406 A    8/2018
(Continued)

OTHER PUBLICATIONS

3GPP "Discussion on the access control per network slice", SA WG2 Meeting #121, S2-173246, May 19, 2017, pp. 1-3, Agenda Item: 6.5.1, 5GS_Ph1 / Rel-15, LG Electronics, Hangzhou, China.
3GPP "Unified Access Control in different RRC Modes", TSG-RAN2 Meeting #99, R2-1709648, Aug. 21-25, 2017, pp. 1-3, Agenda item: 10.4.1.7, Qualcomm Incorporated, Berlin, Germany.
3GPP "Generic Access Barring", TSG-RAN WG2 NR ad-hoc #2, R2-1707087, Jun. 27-29, 2017, pp. 1-3, Agenda Item: 10.4.1.3.4, MediaTek Inc., Qingdao, China.
(Continued)

*Primary Examiner* — Christopher T Wyllie
(74) *Attorney, Agent, or Firm* — Leydig, Voit & Mayer, Ltd.

(57) ABSTRACT

A method for controlling use of user plane radio communication resources of a telecommunications network and/or for controlling access of a user equipment to the telecommunications network includes: transmitting, by the telecommunications network, a plurality of specific suspend time indications to the user equipment, wherein each one of the plurality of specific suspend time indications relates to a different network slice and/or to a different network service; and controlling the use of user plane radio communication resources of the telecommunications network and/or the access of the user equipment to the telecommunications network by deciding whether an attempt to use user plane radio communication resources of the telecommunications network is allowed or disallowed and/or whether an attempt to access the telecommunications network is allowed or disallowed.

9 Claims, 1 Drawing Sheet

(56) References Cited

U.S. PATENT DOCUMENTS

| | | | |
|---|---|---|---|
| 2019/0174392 A1 | 6/2019 | Chun et al. | |
| 2019/0230584 A1* | 7/2019 | Lou | H04W 48/16 |
| 2019/0246334 A1 | 8/2019 | Wang et al. | |
| 2019/0357119 A1 | 11/2019 | Hong et al. | |
| 2019/0357120 A1 | 11/2019 | Fu et al. | |
| 2020/0344670 A1* | 10/2020 | Li | H04W 76/27 |
| 2021/0400573 A1* | 12/2021 | Klatt | H04W 80/02 |
| 2022/0038953 A1* | 2/2022 | Corston-Petrie | H04W 28/088 |
| 2022/0217616 A1* | 7/2022 | Wu | H04W 74/002 |

FOREIGN PATENT DOCUMENTS

| | | | |
|---|---|---|---|
| KR | 20180090189 A | 8/2018 | |
| WO | WO 2017119844 A1 | 7/2017 | |
| WO | WO 2018026185 A1 | 2/2018 | |
| WO | WO-2018030508 A1 * | 2/2018 | H04W 48/10 |
| WO | WO 2018045511 A1 | 3/2018 | |
| WO | WO 2018059494 A1 | 4/2018 | |

OTHER PUBLICATIONS

3GPP "Barring information signalling for 5G unified access control", TSG-RAN WG2 Meeting #101bis R2-1804476, Revision of R2-1800273, Apr. 16-20, 2018, pp. 1-7, Agenda item: 10.4.1.8.2, Spreadtrum Communications, Sanya, China.

3GPP "SIB optimizations for Access Control", TSG-RAN WG2 Meeting #101bis, R2-1805682, Apr. 16-20, 2018, pp. 1-3, Agenda item: 10.4.1.8.2, NR_newRAT-Core—Release 15, Nokia, Nokia Shanghai Bell, Sanya, China.

3GPP "Discussion on the back-off timer duration of SSAC", TSG CT WG1 Meeting #62, C1-095020, Nov. 9-13, 2009, pp. 1-2, Agenda item: 10.9 SSAC, NTT DOCOMO, Beijing, China.

3GPP "Access Control for UE accessing 5GC via LTE", TSG-RAN WG2 #98, R2-1705712, May 15-19, 2017, pp. 1-3, Agenda item: 9.7.2, Huawei, HiSilicon, Hangzhou, China.

* cited by examiner

CONTROLLING THE USE AND/OR ACCESS OF USER PLANE RADIO COMMUNICATION RESOURCES OF A TELECOMMUNICATIONS NETWORK

CROSS-REFERENCE TO PRIOR APPLICATIONS

This application is a U.S. National Phase Application under 35 U.S.C. § 371 of International Application No. PCT/EP2019/077412, filed on Oct. 9, 2019, and claims benefit to European Patent Application No. EP 18199671.1, filed on Oct. 10, 2018. The International Application was published in English on Apr. 16, 2020 as WO 2020/074610 A1 under PCT Article 21(2).

FIELD

The present invention relates to a method for controlling the use of user plane radio communication resources of a telecommunications network and/or for controlling the access of a user equipment to a telecommunications network, wherein the telecommunications network provides the use or activation, by the user equipment, of a plurality of different network slices and/or of different network services.

Furthermore, the present invention relates to a system, user equipment, and telecommunications network for controlling the use of user plane radio communication resources of a telecommunications network and/or for controlling the access of a user equipment to a telecommunications network, wherein the telecommunications network provides the use or activation, by the user equipment, of a plurality of different network slices and/or of different network services.

Additionally, the present invention relates to a program comprising a computer readable program code, and to a computer-readable medium comprising instructions which when executed facilitate performance of a method according to an exemplary embodiment of the present invention.

BACKGROUND

In telecommunications networks, typically cellular mobile telecommunications networks using 4G or 5G systems, the use (by a user equipment) of user plane radio communication resources of the telecommunications network and/or the access (by a user equipment) to the telecommunications network is normally performed via a shared resource medium. In case of an overload situation in the telecommunications network, at least in parts thereof, i.e. typically in parts of the network nodes or network components of the telecommunications network assigned to or responsible for a certain region or geographical area, or for a certain kind (or groups) of communication service(s) or network slice(s), measures to either reduce or at least not increase the overload situation are beneficial.

Examples of such shared resource media in typical situations of a user equipment requesting support or a communication service from the telecommunications network or the allocation or data transmission resources include, in case of the user equipment requesting the use of user plane radio communication resources, e.g. by sending grant requests to the telecommunication network, and in case of the user equipment requesting access to a kind of a random access channel, such as the Random Access CHannel (RACH), which is a control channel, in order to get a data transmission resource allocated by the telecommunications network.

The introduction of the possibility for a user equipment to use network slices (typically providing a higher degree of flexibility of using communication services of the telecommunications network; or other kinds of network services providing for a more fine-grained provision of communication service to the user equipment) also allows a user equipment to request communication services in a plurality of different ways. The use of a specific network slice (of a plurality of different network slices that are, in principle, available within the telecommunications network), or the use of a plurality of network slices typically presumes that the respective user equipment is in a connected mode, wherein the connected mode typically includes a radio resource control (RRC) connection.

In order to prevent a user equipment or a plurality of user equipments from additionally accessing already overloaded network resources (or network resources risking to be overloaded when requested to handle additional requests or traffic), e.g. in parts of the telecommunications network or for a certain kind (or groups) of communication service(s) or network slice(s), it is beneficial to limit the involved user equipments in their ability to request user plane radio communication resources and/or access to such shared media or to the telecommunications network—and also to such network resources (or shared media) that are specific to the use of certain network slices or to the use of at least one network slice provided by the telecommunications network—, at least for certain user equipments or groups thereof, and at least for a certain time interval.

SUMMARY

In an exemplary embodiment, the present invention provides a method for controlling use of user plane radio communication resources of a telecommunications network and/or for controlling access of a user equipment to the telecommunications network. The telecommunications network provides a plurality of different network slices and/or different network services for use or for activation by the user equipment. The method comprises: in a first step, a plurality of specific suspend time indications are transmitted, as part of a set of control channel data, within at least one radio cell or radio coverage area of the telecommunications network, to the user equipment, wherein each one of the plurality of specific suspend time indications relates to a different network slice and/or to a different network service; and in a second step, subsequent to the first step, control—related to the use of at least one of the plurality of different network slices and/or the use of at least one of the different network services—of the use of user plane radio communication resources of the telecommunications network and/or of the access of the user equipment to the telecommunications network is realized with regard to the user equipment by deciding whether an attempt to use user plane radio communication resources of the telecommunications network is allowed or disallowed and/or whether an attempt to access the telecommunications network is allowed or disallowed. In a third step prior to the second step, a global suspend time information is transmitted, as part of the set of control channel data, to the user equipment, and the control of the second step is performed via a combined use of both the global suspend time information and the plurality of specific suspend time indications; or the user equipment is—during the time interval corresponding to the suspend time interval—in a connected state.

BRIEF DESCRIPTION OF THE DRAWINGS

Embodiments of the present invention will be described in even greater detail below based on the exemplary figures.

The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
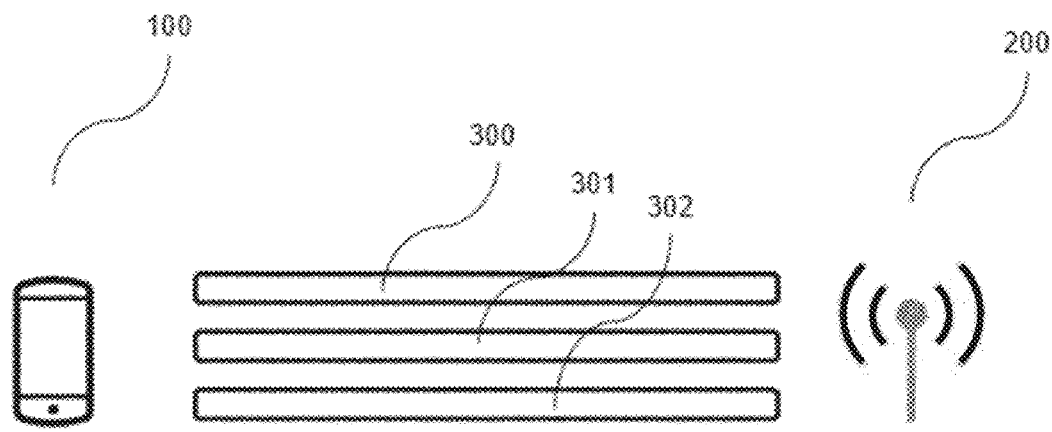
FIG. 1 schematically illustrates a user equipment which is connected to a telecommunications network and which is able to use a plurality of different network slices of or provided by the telecommunications network.

Exemplary embodiments of the present invention provide a method, a system, a user equipment, and a telecommunications network for selectively controlling the use of user plane radio communication resources of a telecommunications network and/or for controlling the access of a user equipment to a telecommunications network via introducing a suspend time interval to control of the use of user plane radio communication resources and/or the control of the access to the telecommunications network. The method according to the present invention takes into account different traffic characteristics and/or communication service characteristics and/or user characteristics and provides for enhanced control of the user equipments requesting user plane radio communication resources and/or access to the telecommunications network by taking a decision whether an attempt (of a user equipment) to use user plane radio communication resources of the telecommunications network and/or whether an attempt (of a user equipment) to access the telecommunications network is allowed or disallowed. Additionally, further exemplary embodiments of the present invention provide a program comprising a computer readable program code, and a computer-readable medium comprising instructions which when executed facilitate performance of a method according to an exemplary embodiment of the present invention.

In an exemplary embodiment, the present invention provides a method for controlling the use of user plane radio communication resources of a telecommunications network and/or for controlling the access of a user equipment to a telecommunications network,
wherein the telecommunications network provides the use or activation, by the user equipment, of a plurality of different network slices and/or of different network services,
wherein—within at least one radio cell or radio coverage area within or as part of the telecommunications network—a set of control channel data is transmitted to the user equipment,
wherein the method comprises the steps of:
in a first step, a plurality of specific suspend time indications are transmitted, as part of the set of control channel data, to the user equipment, wherein each one of the plurality of specific suspend time indications relates to a different network slice and/or to a different network service,
in a second step, subsequent to the first step, a control—related to the use of at least one of the plurality of different network slices and/or the use of at least one of the different network services—of the use of user plane radio communication resources of the telecommunications network and/or of the access of the user equipment to the telecommunications network is realized with regard to the user equipment by deciding whether an attempt to use user plane radio communication resources of the telecommunications network and/or whether an attempt to access the telecommunications network is allowed or disallowed.

In an exemplary embodiment, the present invention provides a method for controlling the use of user plane radio communication resources of a telecommunications network and/or for controlling the access of a user equipment to a telecommunications network,
wherein the telecommunications network provides the use or activation, by the user equipment, of a plurality of different network slices and/or of different network services,
wherein—within at least one radio cell or radio coverage area within or as part of the telecommunications network—a set of control channel data is transmitted to the user equipment,
wherein the method comprises the steps of:
in a first step, a plurality of specific suspend time indications are transmitted, as part of the set of control channel data, to the user equipment, wherein each one of the plurality of specific suspend time indications relates to a different network slice and/or to a different network service,
in a second step, subsequent to the first step, a control—related to the use of at least one of the plurality of different network slices and/or the use of at least one of the different network services—of the use of user plane radio communication resources of the telecommunications network and/or of the access of the user equipment to the telecommunications network is realized with regard to the user equipment by deciding whether an attempt to use user plane radio communication resources of the telecommunications network and/or whether an attempt to access the telecommunications network is allowed or disallowed
wherein either
in a third step prior to the second step, global suspend time information is transmitted, as part of the set of control channel data, to the user equipment, and the control of the second step is performed via a combined use of both the global suspend time information, and the plurality of specific suspend time indications; or
the user equipment is—during the time interval corresponding to the suspend time interval—in a connected state.

According to the present invention, it is advantageously possible to control the use of user plane radio communication resources of the telecommunications network and/or for controlling the access of the user equipment to the telecommunications network in a user equipment specific manner. Thereby, it is advantageously possible to suspend attempts to request user plane radio communication resources of the telecommunications network by an individual user equipment and/or attempts to gain access to the telecommunications network by an individual user equipment.

The introduction of network slicing is seen as an important improvement of 5G mobile communication systems over previously known mobile communication systems. Network slicing means the provision of a plurality of different virtual mobile communication networks, typically having different characteristics, on a common infrastructure of a mobile communication system (or telecommunications network). Examples of network slices of different characteristics include, e.g., Mobile Broadband (MBB), or Ultra-Reliable Low-Latency Communication (URLLC). Typically, a given (or specific) user equipment or mobile terminal is able to use, at a given moment in time, more than one network slice simultaneously, i.e. it is typically able to use (or request user plane radio communication resources from) a plurality of different network slices, such as, e.g., a maximum of two different network slices, or a maximum of three different network slices or a maximum of four different network slices or a maximum of five different network slices or a maximum of six different network slices or a maximum of seven different network sliced or a maximum of eight different network slices or a maximum of nine different network slices or a maximum of ten different network slices. Previously deployed mobile communication systems, compared to 5G systems, also provided the possibility to provide different communication services, in parallel, to a user equipment (or mobile terminal), however, a user equipment (or mobile terminal)—while being in a connected mode— always had to be connected to the telecommunications network via only one logical connection, such as a radio resource control connection (RRC connection) between, on the one hand, the user equipment (or mobile terminal), and, on the other hand, the telecommunications network or the respective base station entity of its access network. This basic concept of a logical connection of a user equipment to the telecommunications network via an RRC connection is, at least in principle, also realized in 5G systems.

In order to react with respect to and/or avoid actual or presumed overload situations within the telecommunications network or parts thereof (such as overload situations in (parts of) the access network or network components thereof, such as base station entities, eNBs (enhanced NodeBs) or gNBs (next generation NodeBs)), there is the possibility to close (or to terminate) the RRC connection of certain (individual) user equipments (e.g. via the RRC connection release message, defined in the 3GPP TS 38.331 standardization document for NR and 3GPP TS 36.331 for enhanced LTE). Thereby, it is even possible to (hard) interrupt an ongoing (or active) transmission of (user plane) data of a peculiar or specific user equipment within the telecommunications network. However, typically an RRC connection is maintained active (or alive) for a longer period of time (until the end of a timer is reached, such as an RRC timeout timer) in order for the user equipment to be able to transmit data to the telecommunications network (and/or receive data from the telecommunications network) without the additional delay of (newly) establishing the (or an) RRC connection between the specific user equipment and the telecommunications network.

In a conventionally known 4G communication system (e.g. LTE), in case of an overload situation, the RRC connection between the telecommunications network and a user equipment would be interrupted, and the user equipment would need to send an RRC connection request in order to get newly connected to the telecommunications network. The telecommunications network (or its access network or the respective base station entity or eNodeB) would then be able to restrict the user equipment from reconnecting to the network, e.g. by using the access class barring principle defined in the 3GPP TS 36.331 standardization document. However, as defined by the 3GPP standards, this access class barring concept is not valid for already existing RRC connections.

According to the present invention, the use of user plane radio communication resources of a telecommunications network and/or the access of a user equipment to a telecommunications network is controlled by imposing a suspend time interval to the user equipment (prior to be able to either use substantial data transmission resources of the telecommunications network, or prior to be able to again request access to the telecommunications network). It is assumed that the telecommunications network provides the use or activation of a plurality of different network slices and/or of different network services (typically this plurality of network slices and/or of different network services are either activated by the user equipment or upon request of the user equipment, or, alternatively, this plurality of network slices and/or of different network services are activated by default policy by the telecommunications network). It is furthermore assumed that—at least within one radio cell or radio coverage area within or as part of the telecommunications network—a set of control channel data is transmitted to the user equipment. As part of this set of control channel data the user equipment receives (i.e. the telecommunications network, or, its access network, especially the respective base station entity, or gNB, transmits), in a first step, a plurality of specific suspend time indications, wherein each one of the plurality of specific suspend time indications relates to a different network slice and/or to a different network service of the telecommunications network, e.g. a first specific suspend time indication relating to a first network slice, a second specific suspend time indication relating to a second network slice, and a third specific suspend time indication relating to a third network slice, . . . , an eighth specific suspend time indication relating to an eighth network slice.

Via the specific suspend time indications, each one indicating (or corresponding to or comprising) information defining a suspend time interval (related to the use of one of the plurality of different network slices and/or to the use of one of the different network services), it is advantageously possible according to the present invention to control the use of user plane radio communication resources of the telecommunications network. Alternatively or cumulatively, via the specific suspend time indications, each one indicating (or corresponding to or comprising) information defining a suspend time interval, it is advantageously possible according to the present invention to control the access of the user equipment to the telecommunications network regarding the use of one of the plurality of different network slices and/or to the use of one of the different network services.

This actually means that it is decided whether an attempt to use user plane radio communication resources of the telecommunications network and/or whether an attempt to access the telecommunications network is allowed or disallowed, i.e.:

within (or during) the suspend time interval—an attempt of the user equipment to use user plane radio communication resources of the telecommunications network, relating to the respective use of one of the different network slices and/or one of the different network services, is disallowed, and/or—likewise within (or during) the suspend time interval—an attempt of the user equipment to access the telecommunications network relating to the respective use of one of the different network slices and/or one of the different network services, is disallowed, and after expiration of the suspend time interval—an attempt of the user equipment to use user plane radio communication resources of the telecommunications network, relating to the respective use of one of the different network slices and/or one of the different network services, is allowed, and/or—likewise after expiration of the suspend time interval—an attempt of the user equipment to access the telecommunications network relating to the respective use of one of the different network slices and/or one of the different network services, is allowed.

In the context of the present invention, embodiments of the present invention are preferred such that—as has already been stated a certain number of times—via the specific suspend time indications, a specific suspend time interval is able to be defined related to the use of one of the plurality of different network slices and/or related to the use of one of the different network services. However, this does not necessarily mean that the specific suspend time indications are limited to relate to the use of one and only one of the plurality of different network slices and/or to relate to the use of one and only one of the different network services: According to further embodiments of the present invention, it is possible and preferred—especially in case of an increase of the number of network slices in use within (or in connection with) the telecommunications network and/or in use, or potentially in use, with the telecommunications network—that a specific suspend time interval is able to be defined related to the use of more than one (but still a subset) of the plurality of different network slices and/or related to the use of more than one (but still a subset) of the different network services; hence, it is possible to define groups (or at least one group) of network slices (or to define groups (or at least one group) of network services), each group of network slices (or of network services) comprising more than one network slices (or network services), wherein for the entire group of network slices (or of network services) one specific suspend time indication (of the plurality of the specific suspend time indications)—if applicable together with the global suspend time information—defines the suspend time interval to be applied for all the network slices (or all the network services) in the group.

According to the present invention, the suspend time interval relating to the respective use of one of the different network slices and/or one of the different network services (to use user plane radio communication resources of the telecommunications network, or to access the telecommunications network) might either be defined directly via the corresponding specific suspend time indication (of the plurality of specific suspend time indications), i.e. each specific suspend time indication specifies its corresponding suspend time interval, or comprises code information referring to the corresponding suspend time interval.

Thereby, a comparatively high degree of flexibility in assigning and transmitting the information regarding the suspend time interval applicable for each different network slice and/or network service is possible to archive.

Alternatively, according to a further embodiment of the present invention, in a third step prior to the second step, global suspend time information is transmitted, as part of the set of control channel data, to the user equipment, and the control of the second step is performed via a combined use of both the global suspend time information, and the plurality of specific suspend time indications.

Thereby, it is advantageously possible to base the determination of the suspend time interval on both information components, namely the global suspend time information, as well as the specific suspend time indications. It is thereby advantageously possible to reduce the data volume to be transmitted in order to transmit the information regarding the suspend time interval for each different network slice and/or network service.

According to the present invention, it is furthermore preferred that each one or at least one of the plurality of specific suspend time indications indicate, for the respective network slice, whether or not the global suspend time information is to be applied, resulting in the user equipment being restricted, for the respective network slice, from using user plane radio communication resources of the telecommunications network or from attempting to access the telecommunications network during a suspend time interval corresponding to the global suspend time information in case the corresponding specific suspend time indication for the respective network slice and/or different network services indicates so.

Thereby, it is advantageously possible to define one applicable suspend time interval (via transmitting the global suspend time information), and to be able to decide (or indicate so via the transmission of the specific suspend time indications, corresponding, in its most basic manner, to the information of a single bit), for each different network slice and/or different network service, whether the one applicable suspend time shall apply (to the respective network slice and/or network service) or not.

According to a further preferred embodiment of the present invention, each one or at least one of the plurality of specific suspend time indications is or comprises factor information to be applied for the respective network slice, resulting in the user equipment being restricted, for the respective network slice, from using user plane radio communication resources of the telecommunications network or from attempting to access the telecommunications network during a suspend time interval corresponding to the global suspend time information multiplied by a factor to be applied for the respective network slice, this factor being indicated by the factor information of the specific suspend time indication.

Thereby, it is advantageously possible to not only use one single applicable suspend time interval (to be either applied (fully) or not at all) but to apply a different suspend time interval for each different network slice and/or different network service, and to transmit the corresponding information in an effective manner in order to save transmission resources.

According to still a further preferred embodiment of the present invention, each one of the plurality of specific suspend time indications is or comprises at least one out of the following:
  a one-bit indication whether or not the global suspend time information is to be applied to one of the plurality of network slices and/or to one of different network services,
  factor information to be applied to one of the plurality of network slices and/or to one of different network services, wherein the suspend time interval corresponds to the global suspend time information multiplied by the factor to be applied for the respective network slice and indicated by the specific suspend time indication or its factor information.

Hence, according to the present invention, the different possibilities of what the specific suspend time indications correspond to might also be mixed, i.e., for example, for a first network slice, the corresponding first specific suspend time indication corresponds to a bit value (indicating whether or not the suspend time interval (defined via the global suspend time information) shall be applied or not), and for a second network slice, the corresponding second specific suspend time indication corresponds to factor information such that the suspend time interval is obtained by multiplying the time interval corresponding to the global suspend time information by a factor to be applied for the respective network slice, this factor being indicated by the factor information of the specific suspend time indication.

According to the present invention, it is furthermore preferred that the global suspend time information, on the one hand, and the plurality of specific suspend time indications, on the other hand, are transmitted
- as part of one subset of control channel data to be transmitted to the user equipment, or
- as part of different subsets of control channel data to be transmitted to the user equipment, especially transmitted at different points in time.

According to the present invention, it is thereby advantageously possible to flexibly transmit the plurality of specific suspend time indications and also the global suspend time information.

According to still a further preferred embodiment of the present invention, the user equipment is—during the time interval corresponding to the suspend time interval—in a connected state, especially without an interruption of the radio resource control connection of the user equipment.

Thereby, it is advantageously possible that the radio resource control connection between the user equipment and the access network of the telecommunications network does not need to be re-established (after being shut down due to an overload situation within the telecommunications network). Hence advantageously—and despite the fact that the radio resource control connection is not necessarily released—, the overload situation can still be handled by the telecommunications network via individually (i.e. on a per user equipment basis) allowing or disallowing the use of one or a plurality of specific network slices or network services (and another one or a plurality of other network slices or network services are still suspended (for a longer or shorter time interval) from being used by the user equipment).

Hence, according to the present invention, it is advantageously possible to avoid requiring a complete interruption of the radio resource control connection (via a general RRC connection release message)—just in order to being able to suspend the use (by one or a plurality of user equipments) of one or a plurality of network slices or network service. With regard to embodiments of the present invention in which the user equipment should not leave a connected state during the time interval corresponding to the suspend time interval (i.e. during this time interval, the RRC connection of the user equipment is maintained), the method provides for controlling the use, by the user equipment, of user plane radio communication resources (and normally not to controlling the access of the user equipment to the telecommunications network—as this access is already provided via the existing RRC connection of the user equipment). Likewise, the plurality of specific suspend time indications (and, if applicable, the global suspend time information) are intended to relate to controlling the use, by the user equipment, of user plane radio communication resources (i.e. normally not to controlling the access of the user equipment to the telecommunications network).

However and also according to the present invention, it is not excluded that the radio resource control connection is indeed (completely) interrupted (or released)—in normal cases (i.e. overload control is, in such an implementation, performed such that RRC connections are indeed (mandatorily) released for such user equipments that are to be at least temporarily blocked)—between the user equipment and the telecommunications network (or its access network). In such a situation (of a complete interruption of the radio resource control connection of the user equipment), via:
- either the specific suspend time indications (alone),
- or both the global suspend time information, and the specific suspend time indications, it is advantageously possible to indicate, to the user equipment, the value of a suspend time interval that has to elapse prior to the user equipment again being allowed to attempt to access the telecommunications network regarding the respective network slice and/or network service; hence an access control of the user equipment to the telecommunications network is provided. Hence, according to such a preferred embodiment of the present invention, the user equipment is—during the time interval corresponding to the suspend time interval—in a disconnected state (or idle state). In such an implementation, the specific suspend time indications (related to respective network slices or network services), especially in addition to the global suspend time information, are all meant to indicate or define the network slice-specific suspend time interval applicable for the access (being re-established) of the user equipment to the telecommunications network (i.e. this access is disallowed while this suspend time interval has not elapsed, and this access is allowed once this suspend time interval has elapsed). Hence, in such an implementation, the method relates to controlling the access of the user equipment to the telecommunications network (and not to controlling the use, by the user equipment, of user plane radio communication resources). Likewise, the plurality of specific suspend time indications (and, if applicable, the global suspend time information) are intended to relate to controlling the access of the user equipment to the telecommunications network (and to controlling the use, by the user equipment, of user plane radio communication resources.

According to still a further preferred embodiment of the present invention, the use, by the user equipment, of user plane radio communication resources of the telecommunications network corresponds to the user equipment receiving payload data and/or user plane data from the telecommunications network and/or the user equipment transmitting payload data and/or user plane data to the telecommunications network.

Thereby, it is advantageously possible to apply the control of radio communication resources to user plane radio communication resources, i.e. to payload data and/or user plane data.

The present invention also relates to a system for controlling the use of user plane radio communication resources of a telecommunications network and/or for controlling the access of a user equipment to a telecommunications network, the system comprising the user equipment and the telecommunications network, wherein the telecommunications network provides the use or activation, by the user equipment, of a plurality of different network slices and/or of different network services, wherein—within at least one radio cell or radio coverage area within or as part of the telecommunications network—the system is configured such that a set of control channel data is transmitted, by the telecommunications network, to the user equipment, wherein the system is configured such that:
  a plurality of specific suspend time indications are transmitted, as part of the set of control channel data and by the telecommunications network, to the user equipment, wherein each one of the plurality of specific suspend time indications relates to a different network slice and/or to a different network service,
wherein the system is configured to control, with regard to the user equipment,
  the use of user plane radio communication resources of the telecommunications network related to the use of at least one of the plurality of different network slices and/or the use of at least one of the different network services, by deciding whether an attempt, by the user equipment, to use user plane radio communication resources of the telecommunications network is allowed or disallowed, and/or
  the access of the user equipment to the telecommunications network by deciding whether an attempt, by the user equipment, to access the telecommunications network is allowed or disallowed.

The present invention furthermore also relates to a system for controlling the use of user plane radio communication resources of a telecommunications network and/or for controlling the access of a user equipment to a telecommunications network, the system comprising the user equipment and the telecommunications network,
wherein the telecommunications network provides the use or activation, by the user equipment, of a plurality of different network slices and/or of different network services,
wherein—within at least one radio cell or radio coverage area within or as part of the telecommunications network—the system is configured such that a set of control channel data is transmitted, by the telecommunications network, to the user equipment,
wherein the system is configured such that:
  a plurality of specific suspend time indications are transmitted, as part of the set of control channel data and by the telecommunications network, to the user equipment, wherein each one of the plurality of specific suspend time indications relates to a different network slice and/or to a different network service,
wherein the system is configured to control, with regard to the user equipment,
  the use of user plane radio communication resources of the telecommunications network related to the use of at least one of the plurality of different network slices and/or the use of at least one of the different network services, by deciding whether an attempt, by the user equipment, to use user plane radio communication resources of the telecommunications network is allowed or disallowed, and/or
  the access of the user equipment to the telecommunications network by deciding whether an attempt, by the user equipment, to access the telecommunications network is allowed or disallowed
wherein either
global suspend time information is transmitted, as part of the set of control channel data, to the user equipment, and the control of the second step is performed via a combined use of both the global suspend time information, and the plurality of specific suspend time indications; or
the user equipment is—during the time interval corresponding to the suspend time interval—in a connected state.
  Thereby, a system is provided to control the use of user plane radio communication resources of a telecommunications network and/or the access of a user equipment to the telecommunications network by imposing a suspend time interval to the user equipment (prior to be able to either use substantial data transmission resources of the telecommunications network, or prior to be able to again request access to the telecommunications network).

The present invention further relates to a user equipment for controlling the use of user plane radio communication resources of a telecommunications network and/or for controlling the access of a user equipment to a telecommunications network, especially as part of a system according to an exemplary embodiment, wherein the user equipment is adapted to use or activate a plurality of different network slices and/or of different network services of the telecommunications network, wherein the user equipment is configured such that—within at least one radio cell or radio coverage area within or as part of the telecommunications network—a set of control channel data, transmitted by the telecommunications network, is received by the user equipment, wherein the user equipment is furthermore configured such that:
  a plurality of specific suspend time indications are received, as part of the set of control channel data, by the user equipment, wherein each one of the plurality of specific suspend time indications relates to a different network slice and/or to a different network service,
wherein the user equipment is configured to control,
  the use of user plane radio communication resources of the telecommunications network related to the use of at least one of the plurality of different network slices and/or the use of at least one of the different network services, by deciding whether an attempt, by the user equipment, to use user plane radio communication resources of the telecommunications network will be allowed or disallowed, and by restricting such attempts to allowed attempts only, and/or
  the access to the telecommunications network by deciding whether an attempt to access the telecommunications network will be allowed or disallowed, and by restricting such attempts to allowed attempts only.

The present invention further also relates to a user equipment for controlling the use of user plane radio communication resources of a telecommunications network and/or for controlling the access of a user equipment to a telecommunications network, especially as part of a system according to an exemplary embodiment, wherein the user equipment is adapted to use or activate a plurality of different network slices and/or of different network services of the telecommunications network, wherein the user equipment is configured such that—within at least one radio cell or radio coverage area within or as part of the telecommunications network—a set of control channel data, transmitted by the telecommunications network, is received by the user equipment, wherein the user equipment is furthermore configured such that:
  a plurality of specific suspend time indications are received, as part of the set of control channel data, by the user equipment, wherein each one of the plurality of specific suspend time indications relates to a different network slice and/or to a different network service,
wherein the user equipment is configured to control,
  the use of user plane radio communication resources of the telecommunications network related to the use of at least one of the plurality of different network slices and/or the use of at least one of the different network services, by deciding whether an attempt, by the user equipment, to use user plane radio communication resources of the telecommunications network will be allowed or disallowed, and by restricting such attempts to allowed attempts only, and/or the access to the telecommunications network by deciding whether an attempt to access the telecommunications network will be allowed or disallowed, and by restricting such attempts to allowed attempts only wherein either global suspend time information is received, as part of the set of control channel data, by the user equipment, and the control of the second step is performed via a combined use of both the global suspend time information, and the plurality of specific suspend time indications; or the user equipment is—during the time interval corresponding to the suspend time interval—in a connected state.

Thereby, a user equipment is provided through which the use of user plane radio communication resources of a telecommunications network and/or the access of the user equipment to the telecommunications network is able to be controlled by imposing, upon the user equipment, a suspend time interval to be elapsed prior to the user equipment being able to either use substantial data transmission resources of the telecommunications network, or prior to being able to again request access to the telecommunications network.

The present invention further relates to a telecommunications network for controlling the use of user plane radio communication resources of a telecommunications network and/or for controlling the access of a user equipment to a telecommunications network, wherein the telecommunications network provides the use or activation, by the user equipment, of a plurality of different network slices and/or of different network services, wherein—within at least one radio cell or radio coverage area within or as part of the telecommunications network—the telecommunications network is configured such that a set of control channel data is transmitted, by the telecommunications network, to the user equipment, wherein the telecommunications network is furthermore configured such that:

a plurality of specific suspend time indications are transmitted, as part of the set of control channel data and by the telecommunications network, to the user equipment, wherein each one of the plurality of specific suspend time indications relates to a different network slice and/or to a different network service, wherein the telecommunications network is configured to control, with regard to the user equipment, the use of user plane radio communication resources of the telecommunications network related to the use of at least one of the plurality of different network slices and/or the use of at least one of the different network services, by deciding whether an attempt, by the user equipment, to use user plane radio communication resources of the telecommunications network is allowed or disallowed, and/or the access of the user equipment to the telecommunications network by deciding whether an attempt, by the user equipment, to access the telecommunications network is allowed or disallowed.

The present invention further also relates to a telecommunications network for controlling the use of user plane radio communication resources of a telecommunications network and/or for controlling the access of a user equipment to a telecommunications network, wherein the telecommunications network provides the use or activation, by the user equipment, of a plurality of different network slices and/or of different network services, wherein—within at least one radio cell or radio coverage area within or as part of the telecommunications network—the telecommunications network is configured such that a set of control channel data is transmitted, by the telecommunications network, to the user equipment, wherein the telecommunications network is furthermore configured such that:

a plurality of specific suspend time indications are transmitted, as part of the set of control channel data and by the telecommunications network, to the user equipment, wherein each one of the plurality of specific suspend time indications relates to a different network slice and/or to a different network service, wherein the telecommunications network is configured to control, with regard to the user equipment, the use of user plane radio communication resources of the telecommunications network related to the use of at least one of the plurality of different network slices and/or the use of at least one of the different network services, by deciding whether an attempt, by the user equipment, to use user plane radio communication resources of the telecommunications network is allowed or disallowed, and/or the access of the user equipment to the telecommunications network by deciding whether an attempt, by the user equipment, to access the telecommunications network is allowed or disallowed wherein either global suspend time information is transmitted, as part of the set of control channel data, to the user equipment, and the control of the second step is performed via a combined use of both the global suspend time information, and the plurality of specific suspend time indications; or the user equipment is—during the time interval corresponding to the suspend time interval—in a connected state.

Thereby, a telecommunications network is provided to control the use of user plane radio communication resources of a telecommunications network and/or the access of a user equipment to the telecommunications network by imposing a suspend time interval to the user equipment (prior to be able to either use substantial data transmission resources of the telecommunications network, or prior to be able to again request access to the telecommunications network).

Additionally, it is preferred according to the present invention—with a system as well with a user equipment and telecommunications network—that global suspend time information is transmitted, as part of the set of control channel data and by the telecommunications network, to the user equipment, or wherein global suspend time information is received, as part of the set of control channel data, by the user equipment, and wherein the control is performed via a combined use of both the global suspend time information, and the plurality of specific suspend time indications.

It is thereby advantageously possible to archive a comparatively high degree of flexibility in assigning and transmitting the information regarding the suspend time interval applicable for each different network slice and/or network service.

Furthermore, the present invention relates to a program comprising a computer readable program code which, when executed on a computer or on a user equipment or on a network node of a telecommunications network, or in part on the user equipment and/or in part on the network node of the telecommunications network, causes the computer or the user equipment or the network node of the telecommunications network to perform a method according to the present invention.

Additionally, the present invention relates to a computer-readable medium comprising instructions which when executed on a computer or on a user equipment or on a network node of a telecommunications network, or in part on the user equipment and/or in part on the network node of the telecommunications network, causes the computer or the user equipment or the network node of the telecommunications network to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

According to the present invention, an improved method for controlling, in a network slice-dependent (or network slice-specific) manner, the use of user plane radio communication resources of a telecommunications network and/or the access of a user equipment to a telecommunications network is provided. It is assumed according to the present invention that the telecommunications network 200 provides the use or activation of a plurality of different network slices 300, 301, 302 and/or of different network services.

In FIG. 1, a user equipment 100 connected to a telecommunications network 200 (or connected to a base station entity, such as, e.g., an eNodeB or gNodeB entity, as part of an access network of the telecommunications network 200) is schematically shown. In a conventionally known manner, the telecommunications network 200 is a cellular mobile communication network, comprising an access network (and typically also a core network), and the access network typically comprising a plurality of base station entities, such as eNodeB and/or gNodeB base station entities, such base station entities serving radio cells, i.e. radio coverage areas of these base station entities, in a conventionally known manner.

Furthermore, in a conventionally known manner, at least within one radio cell or radio coverage area within or as part of the telecommunications network 200, a set of control channel data is transmitted to the user equipment 100.

As already mentioned, the user equipment 100 is able to use a plurality of different network slices 300, 301, 302 of or provided by the telecommunications network 200 (or it is able to use a plurality of different network services). In the exemplary representation of FIG. 1, three network slices are schematically shown, namely a first network slice 300, a second network slice 301, and the third network slice 302. According to the present invention, the only limitation in the number of network slices 300, 301, 302 is the possibility of the telecommunications network 200 to provide or manage (and, if applicable, of the user equipment 100 to handle) network slices 300, 301, 302. A typical realistic number of network slices 300, 301, 302 to be, in principle, provided and/or activated by the telecommunications network 200 and/or by the user equipment 100 might be eight network slices, but an increased number of such network slices, such as nine, ten, eleven or twelve network slices are possible as well according to the present invention.

In 5G networks, network slicing allows customers to enjoy connectivity and data processing tailored to specific requirements (e.g. in line with a Service Level Agreement (SLA) agreed with an operator of the telecommunications network), the customizable network capabilities typically including one or a plurality out of the following: data speed, quality, latency, reliability, security, and services. From a mobile operator's point of view, a network slice is an independent end-to-end logical network that runs on a shared physical infrastructure, capable of providing a negotiated service quality. The technology enabling network slicing is transparent to customers of the network. A network slice could span across multiple parts of the network (e.g. terminal, access network, core network and transport network) and could also be deployed across multiple operators. A network slice comprises dedicated and/or shared resources, e.g. in terms of processing power, storage, and bandwidth and typically has the possibility of being isolated from the other network slices. Slice types could be defined from a functional or behavioral perspective. Mobile network operators are able to deploy a single network slice type that satisfies the needs of multiple verticals, as well as multiple network slices of different types that are packaged as a single product targeted towards business customers (a business bundle) who have multiple and diverse requirements (for example a vehicle may need simultaneously a high bandwidth slice for infotainment and an ultra-reliable slice for telemetry, assisted driving).

According to the method in an exemplary embodiment of the present invention, the use, by the user equipment 100, of user plane radio communication resources of the telecommunications network 200 can be more efficiently controlled compared to the conventionally known methods. Especially in situations of network overload (or presumed or anticipated network overload) in a smaller or bigger part (or geographical region) of the telecommunications network 200 (e.g. involving one or a plurality of different radio cells of the telecommunications network 200), a method is utilized to effectively reduce such network load, especially network load created by user equipments triggering or requesting user plane data transmission to and/or from the telecommunications network 200 (such user equipments 100 typically being located in the respective part or geographical region experiencing the network overload). According to embodiments of the present invention, the use of user plane radio communication resources of the telecommunications network 200 is controlled by imposing, to the user equipment 100, a network slice-dependent (or network slice-specific) suspend time interval 700, i.e. prior to the user equipment 100 being able to use substantial data transmission resources of the telecommunications network 200 (involving the use of a specific network slice and/or the use of a specific network service), the suspend time interval 700

(for that specific network slice and/or specific network service) needs to have elapsed.

For the enhanced and more efficient control of the use of user plane radio communication resources of the telecommunications network 200 according to the present invention, it is advantageous that the user equipment 100 stays—during the time interval corresponding to the suspend time interval 700—in a connected state, especially without an interruption of the radio resource control connection of the user equipment 100. Hence, as the imposition (or application) of the suspend time interval 700 does not necessarily require the radio resource control connection being shut down, the radio resource control connection between the user equipment 100 and the access network of the telecommunications network 200 does not need to be re-established, thus avoiding otherwise necessary overhead traffic and network as well as user equipment resources. Hence advantageously according to the present invention, an overload situation can still be handled by the telecommunications network 200 via individually (i.e. on a per user equipment basis) allowing or disallowing the use of one or a plurality of specific network slices 300, 301, 302 or network services (and another one or a plurality of other network slices or network services are still suspended (for a longer or shorter time interval) from being used by the user equipment 100).

However, even though a (complete) release of the radio resource control connection between the user equipment 100 and the telecommunications network 200 occurs, it is possible according to the present invention to more efficiently control (compared to the conventionally known methods) the access of the user equipment 100 to the telecommunications network 200. According to further embodiments of the present invention, the access of the user equipment 100 to the telecommunications network 200 is controlled by imposing, to the user equipment 100, a network slice-dependent (or network slice-specific) suspend time interval 700, i.e. prior to the user equipment 100 being able to access the telecommunications network 200 (involving the use of a specific network slice and/or the use of a specific network service), the suspend time interval 700 (for that specific network slice and/or specific network service) needs to have elapsed.

Figure 2:
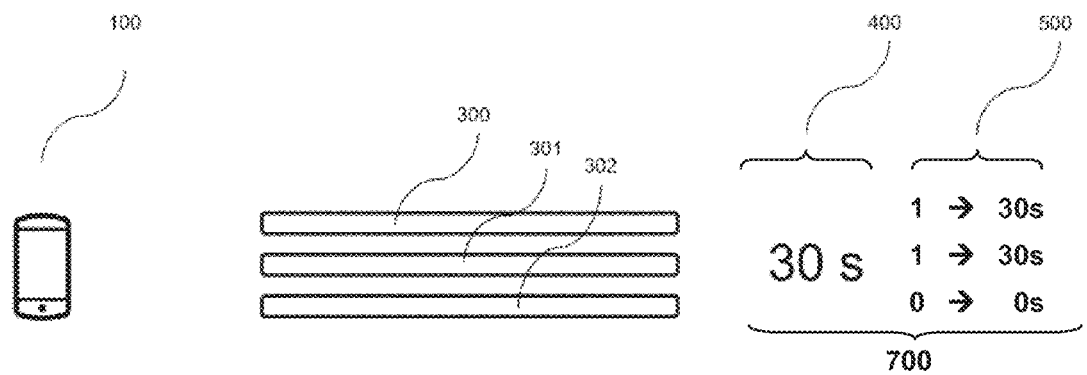
FIG. 2 schematically illustrates the user equipment, the telecommunications network, and a first exemplary scenario of indicating a suspend time interval via global suspend time information and a plurality of specific suspend time indications.

However, according to embodiments of the present invention, the information regarding the suspend time interval 700 to be applied in a network slice-dependent manner, is to be transmitted to the user equipment 100. As part of the set of control channel data, the user equipment 100 receives (i.e. the telecommunications network 200, or, its access network, especially the respective base station entity, or gNodeB, transmits), in a first step, a plurality of specific suspend time indications 500, 600, wherein each one of the plurality of specific suspend time indications 500, 600 relates to a different network slice 300, 301, 302 and/or to a different network service of the telecommunications network 200, e.g. a first specific suspend time indication relating to a first network slice 300, a second specific suspend time indication relating to a second network slice 301, and a third specific suspend time indication relating to a third network slice 302. This is schematically shown—for two exemplary scenarios—in FIGS. 2 and 3: In FIG. 2, a first exemplary scenario of indicating a suspend time interval 700 via global suspend time information 400 and a plurality of specific suspend time indications 500 is schematically shown, and in FIG. 3, a second exemplary scenario of indicating a suspend time interval 700 via global suspend time information 400 and a plurality of specific suspend time indications 600 is schematically shown.

According to the first exemplary scenario, represented in FIG. 2, the specific suspend time indications 500 indicate, for the respective network slice 300, 301, 302, whether or not the global suspend time information 400 is to be applied (i.e. the specific suspend time indications 500 correspond or comprise essentially a one-bit value), and the suspend time interval 700 for the respective network slice 300, 301, 302 corresponds to the global suspend time information 400 (indicating, e.g., a value of "30 seconds") for such network slices 300, 301, 302 for which the corresponding specific suspend time indications 500 indicate that the global suspend time information 400 shall apply (in the exemplary scenario represented in FIG. 2, this is the case for the first and second network slice 300, 301 but not for the third network slice).

Figure 3:
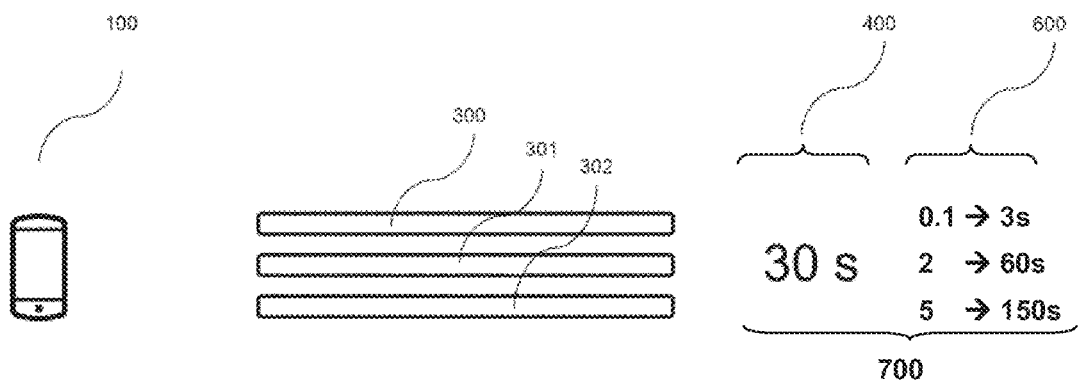
FIG. 3 schematically illustrates the user equipment, the telecommunications network, and a second exemplary scenario of indicating a suspend time interval via global suspend time information and a plurality of specific suspend time indications.

According to the second exemplary scenario, represented in FIG. 3, the specific suspend time indications 600 are or comprise factor information to be applied for the respective network slice 300, 301, 302. As a result, the user equipment 100 is restricted, for the respective network slice 300, 301, 302, from using user plane radio communication resources of the telecommunications network 200 during the suspend time interval 700, and the suspend time interval corresponds to the global suspend time information 400 multiplied by a factor to be applied for the respective network slice 300, 301, 302, this factor being indicated by the factor information of the specific suspend time indication 600. In the exemplary scenario represented in FIG. 3, the specific suspend time indication for the first network slice 300 indicates (via the corresponding factor information), e.g., a factor of 0.1, hence resulting in a suspend time interval of 3 seconds based on (as in the first exemplary scenario) global suspend time information 400 indicating, e.g., a value of 30 seconds. The specific suspend time indication for the second network slice 301 indicates, e.g., a factor of 2, hence resulting in a suspend time interval of 60 seconds based again on global suspend time information 400 indicating, e.g., a value of 30 seconds. The specific suspend time indication for the third network slice 302 indicates, e.g., a factor of 5, hence resulting in a suspend time interval of 150 seconds based again on global suspend time information 400 indicating, e.g., a value of 30 seconds.

Even though both FIGS. 2 and 3 schematically represent exemplary embodiments involving the transmission of the global suspend time information 400, such global suspend time information is not necessarily required: According to other embodiments of the present invention (not specifically shown in the figures), the specific suspend time indications 500, 600 comprise, respectively, an indication regarding the suspend time interval 700 to be applied to the respective network slice 300, 301, 302 or respective network service.

Furthermore, the different possibilities of what the specific suspend time indications 500, 600 correspond to can be mixed, i.e., for example, for the first network slice 300, the corresponding first specific suspend time indication 500 corresponds to a bit value (indicating whether or not the suspend time interval 700 (defined via the global suspend time information 400) shall be applied or not), and for the second network slice 301, the corresponding second specific suspend time indication 600 corresponds to factor information such that the suspend time interval 700 is obtained by multiplying the time interval corresponding to the global suspend time information 400 by a factor to be applied for the respective network slice, this factor being indicated by the factor information of the specific suspend time indication 600.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling use of user plane radio communication resources of a telecommunications network and/or for controlling access of a user equipment to the telecommunications network,
   wherein the telecommunications network provides a plurality of different network slices and/or different network services for use or for activation by the user equipment,
   wherein the method comprises:
   in a first step, a plurality of specific suspend time indications are transmitted, as part of a set of control channel data, within at least one radio cell or radio coverage area of the telecommunications network, to the user equipment, wherein each one of the plurality of specific suspend time indications relates to a different network slice and/or to a different network service; and
   in a second step, subsequent to the first step, control— related to the use of at least one of the plurality of different network slices and/or the use of at least one of the different network services—of the use of user plane radio communication resources of the telecommunications network and/or of the access of the user equipment to the telecommunications network is realized with regard to the user equipment by deciding whether an attempt to use user plane radio communication resources of the telecommunications network is allowed or disallowed and/or whether an attempt to access the telecommunications network is allowed or disallowed;
   wherein:
      in a third step prior to the second step, a global suspend time information is transmitted, as part of the set of control channel data, to the user equipment, and the control of the second step is performed via a combined use of both the global suspend time information and the plurality of specific suspend time indications, or
      the user equipment is—during the time interval corresponding to the suspend time interval—in a connected state; and
      at least one of the plurality of specific suspend time indications comprises factor information to be applied for a respective network slice, resulting in the user equipment being restricted, for the respective network slice, from using user plane radio communication resources of the telecommunications network or from attempting to access the telecommunications network during a suspend time interval corresponding to the global suspend time information multiplied by a factor to be applied for the respective network slice, the factor being indicated by the factor information of the specific suspend time indication.

2. The method according to claim 1, wherein at least one of the plurality of specific suspend time indications indicates, for a respective network slice, whether or not the global suspend time information is to be applied, resulting in the user equipment being restricted, for the respective network slice, from using user plane radio communication resources of the telecommunications network or from attempting to access the telecommunications network during a suspend time interval corresponding to the global suspend time information in case the corresponding specific suspend time indication for the respective network slice and/or different network services indicates so.

3. The method according to claim 1, wherein each one of the plurality of specific suspend time indications comprises at least one out of the following:
   a one-bit indication of whether or not the global suspend time information is to be applied to one of the plurality of network slices and/or to one of different network services; or
   factor information to be applied to one of the plurality of network slices and/or to one of different network services, wherein the suspend time interval corresponds to the global suspend time information multiplied by the factor to be applied for the respective network slice and indicated by the specific suspend time indication or its factor information.

4. The method according to claim 1, wherein the global suspend time information, on the one hand, and the plurality of specific suspend time indications, on the other hand, are transmitted as part of one subset of control channel data to be transmitted to the user equipment, or as part of different subsets of control channel data to be transmitted to the user equipment.

5. The method according to claim 1, wherein the user equipment is—during the time interval corresponding to the suspend time interval—in a connected state without an interruption of a radio resource control connection of the user equipment.

6. The method according to claim 1, wherein the use, by the user equipment, of user plane radio communication resources of the telecommunications network corresponds to the user equipment receiving payload data and/or user plane data from the telecommunications network and/or the user equipment transmitting payload data and/or user plane data to the telecommunications network.

7. A telecommunications system for controlling use of user plane radio communication resources of a telecommunications network and/or for controlling access of a user equipment to the telecommunications network, the system comprising:
the user equipment; and
the telecommunications network;
wherein the telecommunications network is configured to provide a plurality of different network slices and/or different network services for use or for activation by the user equipment;
wherein the telecommunications network is configured to transmit a plurality of specific suspend time indications, as part of a set of control channel data, within at least one radio cell or radio coverage area of the telecommunications network, to the user equipment, wherein each one of the plurality of specific suspend time indications relates to a different network slice and/or to a different network service;
wherein the telecommunications network is configured to control, with regard to the user equipment,
the use of user plane radio communication resources of the telecommunications network related to the use of at least one of the plurality of different network slices and/or the use of at least one of the different network services, by deciding whether an attempt, by the user equipment, to use user plane radio communication resources of the telecommunications network is allowed or disallowed, and/or
the access of the user equipment to the telecommunications network by deciding whether an attempt, by the user equipment, to access the telecommunications network is allowed or disallowed;
wherein
the telecommunications network is configured to transmit global suspend time information, as part of the set of control channel data, to the user equipment, wherein both the global suspend time information and the plurality of specific suspend time indications are used for controlling the use of user plane radio communication resources of the telecommunications network and/or the access of the user equipment to the telecommunications network, or
the user equipment is configured—during the time interval corresponding to the suspend time interval—to be in a connected state; and
at least one of the plurality of specific suspend time indications comprises factor information to be applied for a respective network slice, resulting in the user equipment being restricted, for the respective network slice, from using user plane radio communication resources of the telecommunications network or from attempting to access the telecommunications network during a suspend time interval corresponding to the global suspend time information multiplied by a factor to be applied for the respective network slice, this factor being indicated by the factor information of the specific suspend time indication.

8. The system according to claim 7, wherein the telecommunications network is configured to transmit the global suspend time information, as part of the set of control channel data, to the user equipment, and wherein both the global suspend time information and the plurality of specific suspend time indications are used for controlling the use of user plane radio communication resources of the telecommunications network and/or the access of the user equipment to the telecommunications network.

9. A non-transitory computer-readable medium having processor-executable instructions for controlling use of user plane radio communication resources of a telecommunications network and/or for controlling access of a user equipment to the telecommunications network,
wherein the telecommunications network provides a plurality of different network slices and/or different network services for use or for activation by the user equipment,
wherein the processor-executable instructions, when executed, facilitate:
in a first step, a plurality of specific suspend time indications are transmitted, as part of the set of control channel data, within at least one radio cell or radio coverage area of the telecommunications network, to the user equipment, wherein each one of the plurality of specific suspend time indications relates to a different network slice and/or to a different network service; and
in a second step, subsequent to the first step, control—related to the use of at least one of the plurality of different network slices and/or the use of at least one of the different network services—of the use of user plane radio communication resources of the telecommunications network and/or of the access of the user equipment to the telecommunications network is realized with regard to the user equipment by deciding whether an attempt to use user plane radio communication resources of the telecommunications network is allowed or disallowed and/or whether an attempt to access the telecommunications network is allowed or disallowed;
wherein:
in a third step prior to the second step, a global suspend time information is transmitted, as part of the set of control channel data, to the user equipment, and the control of the second step is performed via a combined use of both the global suspend time information and the plurality of specific suspend time indications, or
the user equipment is—during the time interval corresponding to the suspend time interval—in a connected state; and
at least one of the plurality of specific suspend time indications comprises factor information to be applied for a respective network slice, resulting in the user equipment being restricted, for the respective network slice, from using user plane radio communication resources of the telecommunications network or from attempting to access the telecommunications network during a suspend time interval corresponding to the global suspend time information multiplied by a factor to be applied for the respective network slice, this factor being indicated by the factor information of the specific suspend time indication.

* * * * *